US 6,736,371 B1

(12) United States Patent
Burrows

(10) Patent No.: US 6,736,371 B1
(45) Date of Patent: May 18, 2004

(54) EXTENDIBLE JACK BAR

(75) Inventor: Ward C. Burrows, Pasadena, CA (US)

(73) Assignee: Ancra International, LLC., Hawthorne, CA (US)

( * ) Notice: Subject to any disclaimer, the term of this patent is extended or adjusted under 35 U.S.C. 154(b) by 0 days.

(21) Appl. No.: 10/395,658

(22) Filed: Mar. 24, 2003

Related U.S. Application Data

(60) Provisional application No. 60/367,641, filed on Mar. 27, 2002.

(51) Int. Cl.[7] .................................................. B66F 3/00
(52) U.S. Cl. ........................ 254/133; 254/114; 254/116; 254/134
(58) Field of Search ............................. 254/133 A, 113, 254/116, 134, 164, 105, 114, 119, 133 R

(56) References Cited

U.S. PATENT DOCUMENTS

| 2,820,626 A | * | 1/1958 | Hedoen ..................... 267/171 |
| 3,995,565 A |   | 12/1976 | Kersey |
| 4,660,806 A | * | 4/1987 | Masters ....................... 254/11 |
| 4,695,035 A | * | 9/1987 | Kennedy et al. ........... 254/93 R |
| 5,215,288 A | * | 6/1993 | Lyon ......................... 254/133 A |
| 6,152,434 A | * | 11/2000 | Gluck .............................. 269/6 |
| 6,220,573 B1 | * | 4/2001 | Bromberek ............. 254/133 A |

* cited by examiner

Primary Examiner—Joseph J. Hail, III
Assistant Examiner—Daniel Shanley
(74) Attorney, Agent, or Firm—Edward A. Sokolski

(57) ABSTRACT

A central tube has a rectangular cross section and is attached to an end piece which abuts against a wall of a compartment or the side of an object to be held in place. The other end of the central tube is telescopically fitted within a second rectangular tube. One surface of the central tube is ratcheted and a handle operated ratchet drive mechanism is mounted on the end of the second tube towards the end piece. The second tube is telescopically fitted within a third tube having a rectangular cross section. The remote end of the third tube is fixedly attached to a second end piece which abuts against either a compartment wall or an object to be held in place. The second tube is joined to the third tube at any one of three extension positions of the third bar relative to the second bar thereby setting the jack bar at a predetermined length. This length can then be increased to hold the cargo in position by actuating the ratchet mechanism.

6 Claims, 4 Drawing Sheets

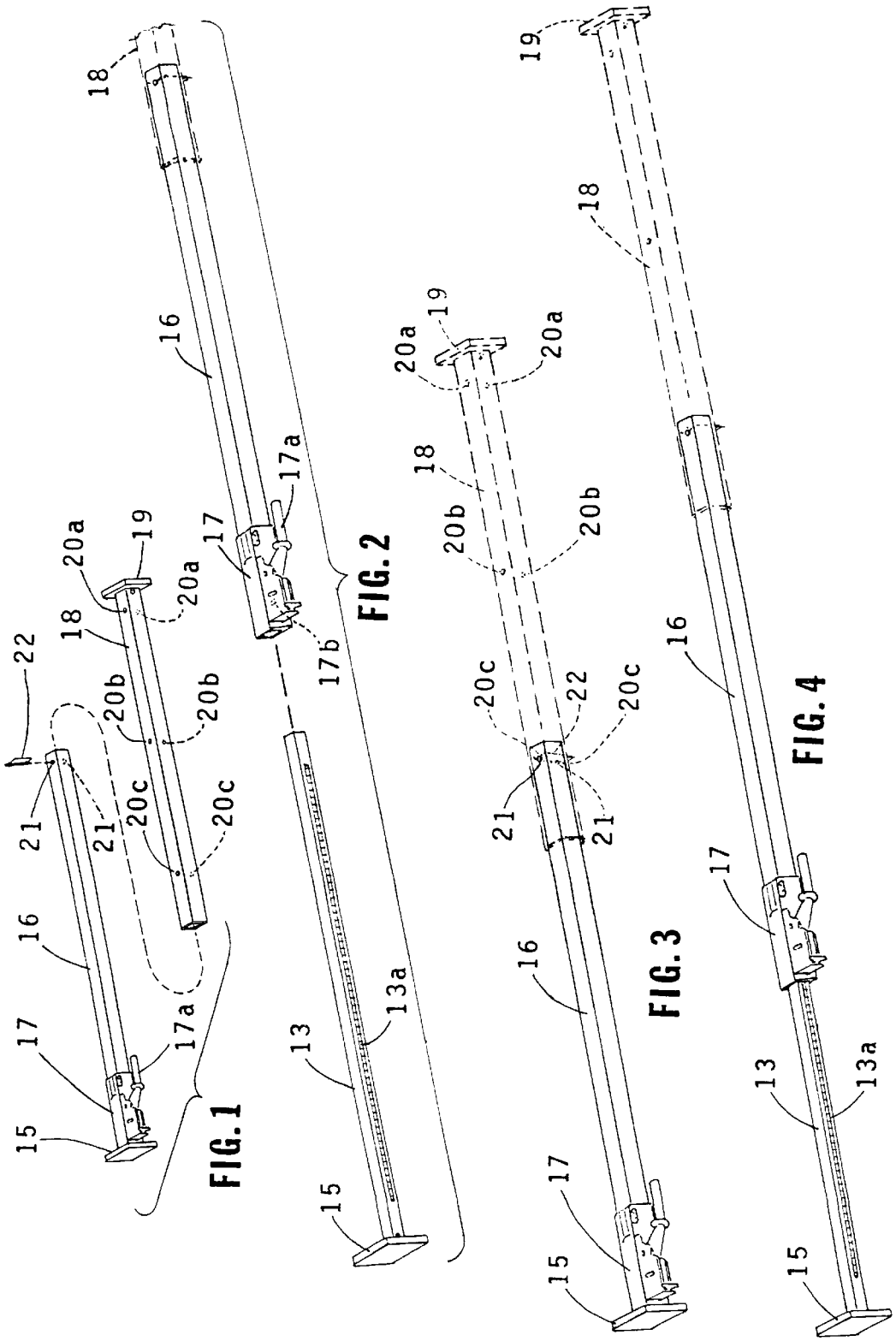

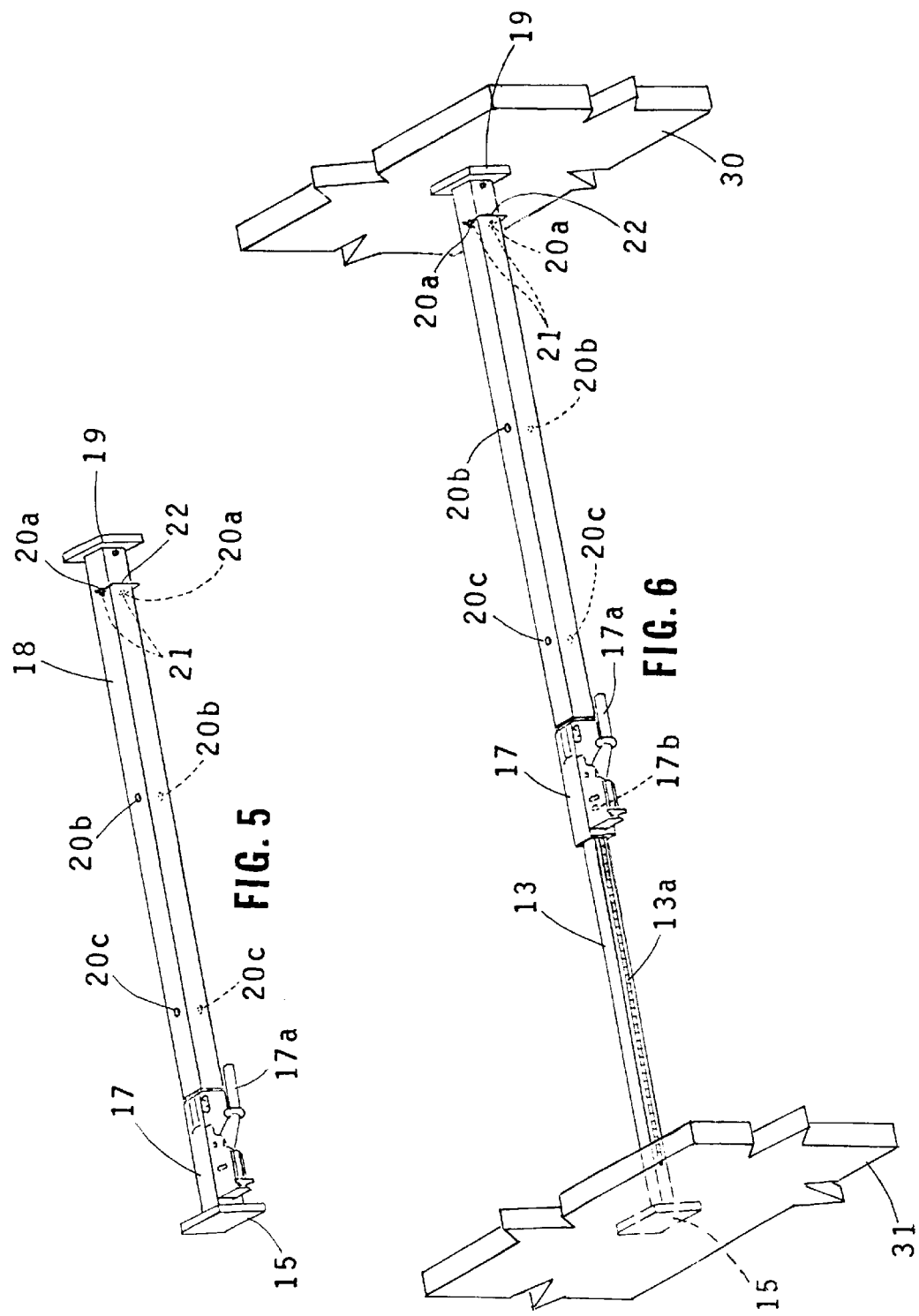

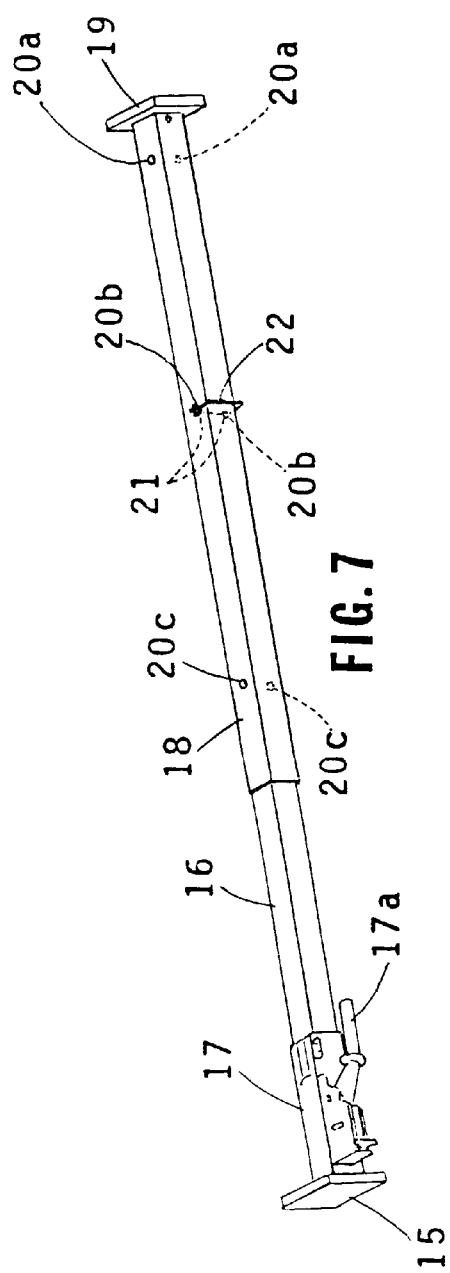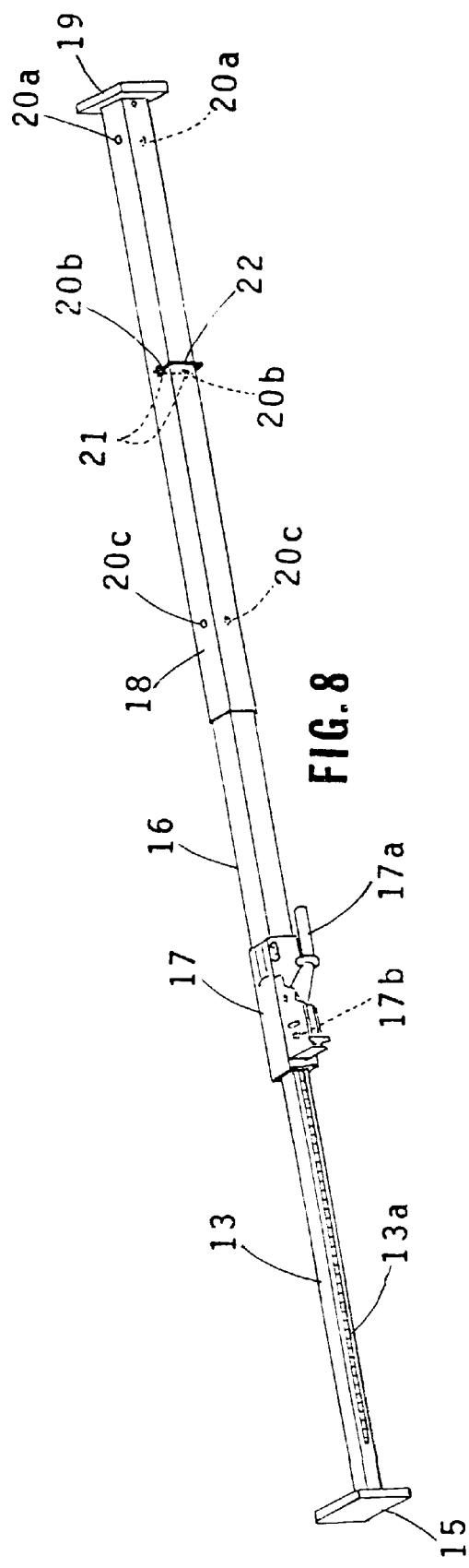
FIG. 7
FIG. 8

EXTENDIBLE JACK BAR

This application is based on Provisional Application No. 60/367,641 filed Mar. 27, 2002.

BACKGROUND OF THE INVENTION

1. Field of the Invention

This invention relates to a jack bar device for retaining cargo in position in a compartment and more particularly to such a device which employs rectangular tubes and which has an expansive adjustment range.

2. Description of the Related Art

Jack bars are commonly used to prevent the shifting of cargo in the compartments of trailers or other transportation carriers. In most instances such prior art jack bars have a single predetermined maximum length with their adjustment being limited by the range of the jack mechanism. This limits their utilization in that each jack bar can only be used within a relatively small distance range between the wall and the cargo. Thus a number of jack bars with different ranges must be kept on hand to accommodate these differences. Further, most prior art jack bars utilize circular tubes which are telescopically fitted into each other. The use of circular tubes has the disadvantage of permitting the tube members to rotate relative to each other which can hamper the security of the holding action. A jack bar which has a greater range of longitudinal adjustment than most prior art jack bars is described in U.S. Pat. No. 3,995,565 issued on Dec. 7, 1976 to Kersey. In the Kersey device an outer circular tube member is mounted on an inner circular tube member being urged out of the inner member by means of springs. While providing increased range over most prior art jacks, this device still has considerably less range than to be desired. Further, the use of circular tubing has the disadvantage set forth above. In addition, the use of springs has the disadvantage of decreased tension with usage and the possibility of spring breakage.

SUMMARY OF THE INVENTION

The device of the invention overcomes the shortcomings of the prior art in providing a much greater range of longitudinal adjustment while avoiding the possibility of rotation of the tube members relative to each other.

The device of the present invention employs a central tube member having a rectangular cross section. One end of the central tube member is attached to a first end piece of the jack bar; this first end piece abuts against the wall of the compartment in which cargo is stowed or the side of cargo to be held in position. A second rectangular tube member is telescopically fitted within the central tube member. One surface of the central tube member is ratcheted and a handle operated ratchet drive mechanism is mounted on the end of the second tube member towards the first end piece. The second tube member is fitted within a third tube member having a rectangular cross section. The remote end of the third tube member is attached to a second end piece on the end of the jack bar opposite that to which the first end piece is attached. As for the opposite end piece the second end piece abuts either against a compartment wall or the cargo or other object in the compartment.

The third tube member has a plurality of sets of opposing apertures along the side walls thereof, these apertures being located at predetermined spaced apart positions along the length of the third tube member. The second tube member has a single pair of opposing apertures formed in the side walls thereof. The second and third tube members are joined together by a snap pin fitted through the apertures of the second tube member and any one of the pairs of apertures of said third tube member. In this manner the length of the jack bar can be adjusted to a desired position over a wide length. In retaining the cargo in position, the ratchet drive mechanism is actuated by means of its handle to drive the ratchets of the second tube to increase the length of the jack bar so as to tighten it between the compartment wall and the cargo or other object being retained in position.

DESCRIPTION OF THE DRAWINGS

FIG. 1 is an exploded perspective view of a preferred embodiment of the invention;

FIG. 2 is an exploded perspective view of the preferred embodiment showing the central tube removed from the second tube;

FIG. 3 is a side perspective view of the preferred embodiment showing the central and second tube members with the ratchet mechanism in its initial position;

FIG. 4 is a side perspective view of the preferred embodiment showing the central and second tube members with the ratchet mechanism in its extended position;

FIG. 5 is a side perspective view of the preferred embodiment showing the jack bar in its smallest extended position with the ratchet mechanism in its initial position;

FIG. 6 is a side perspective view of the preferred embodiment with the extension as shown in FIG. 5 but with the ratchet mechanism in its fully extended position and the cargo held in position against a compartment wall;

FIG. 7 is a side perspective view of the preferred embodiment with the device in its middle extension position;

FIG. 8 is a side perspective view of the preferred embodiment as shown in FIG. 7 but with the ratchet mechanism in its extended position;

DETAILED DESCRIPTION OF THE INVENTION

Figure 9:
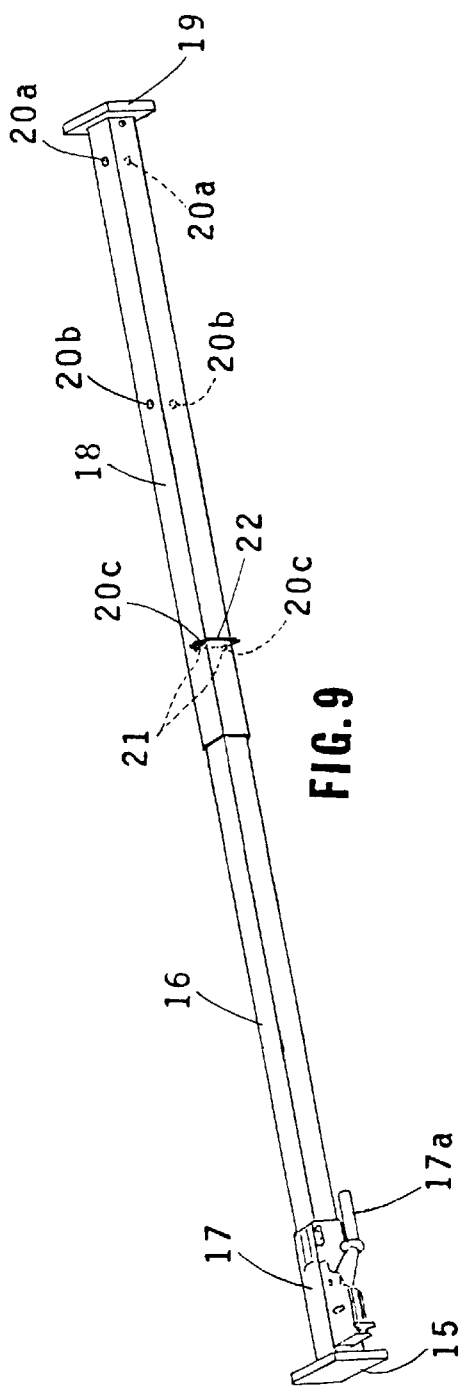
FIG. 9 is a side perspective view of the preferred embodiment showing the devise of the invention in its greatest extension position.

Referring to the FIGS, central tube member 13 is rectangular in cross section and has ratchets 13a formed on one side surface thereof. End piece 15 is attached to one end of the central tube. The other end of his central tube is telescopically fitted within second rectangular tube member 16. Ratchet drive mechanism 17 is mounted on the end of tube member 16. Ratchet drive mechanism 17 has an operating handle 17a and a ratchet pawl 17b which engages the ratchets 13a formed on the central tube. Second tube member 16 is telescopically fitted within third rectangular tube member 18. End piece 19 is attached to the third tube member at its remote end. In the final holding position of the jack bar, one of the end pieces 15 or 19 is in abutment against a wall 31 of the compartment in which the cargo 30 (or other object) is loaded while the other end piece is in abutment against the cargo.

Figure 10:
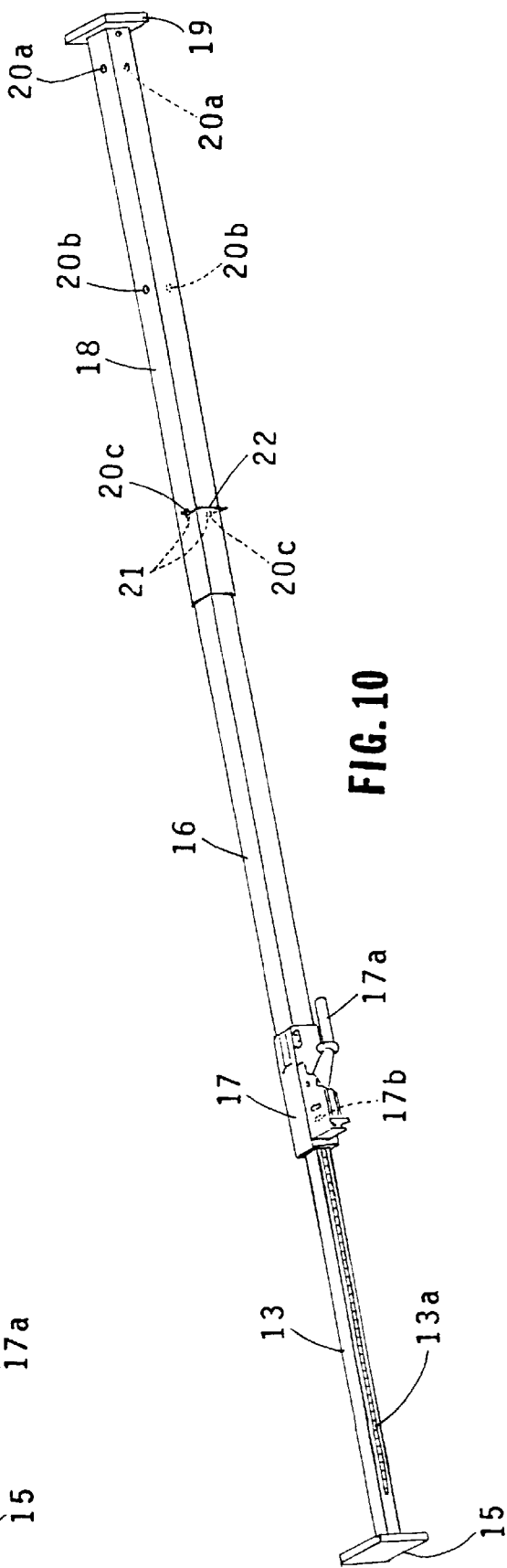
FIG. 10 is a side perspective view of the preferred embodiment in the extension position shown in FIG. 9 but with the ratchet mechanism in its extended position.

Third tube member 18 has a plurality of pairs of opposing apertures 20a–20c. formed in spaced relationship on opposite walls thereof. Second tube member 16 has a single pair of apertures 21 formed near the end thereof. The second tube member is positioned within the third tube and a snap pin 22 is fitted trough one of the pairs of apertures 20–20c and apertures 21 to set the jack bar at any one of three different lengths; as shown in FIG. 5(shortest), FIGS. 7 and 8(medium), and FIGS. 9 and 10(longest). It is to be noted that the length of the jack bar can be increased by means of the ratchet drive mechanism as shown in FIGS. 4, 8, and 10. The ratchet drive mechanism is used to bring the jack bar to its final position in tight abutment between the cargo 30 and the compartment wall 31 as shown in FIG. 6.

While the invention has been described and illustrated in detail, it is to be understood that this is by way of illustration and example only and is not to be taken by way of limitation, the spirit and scope of the invention being limited only by the terms of the following claims.

I claim:

1. An extendible jack bar for retaining an object in a compartment having at least one wall comprising:

a central tube member having a ratchet formed on the outer wall thereof;

a first end piece attached to one end of said central tube member;

a second tube member, said central tube member being telescopically fitted within said second tube member;

a ratchet drive mechanism mounted on an end wall of said second tube member, said ratchet drive mechanism including an operating handle and a ratchet pawl which engages the ratchet formed on the central tube member, said ratchet drive mechanism driving said central tube member out of said second tube member and retaining said central tube member in the position relative to said second tube member to which it is driven;

a third tube member, said second tube member being telescopically fitted within said third tube member;

a second end piece attached to the end of said third tube member opposite to that through which said second tube member is fitted, one of said end pieces abutting against the compartment wall and the other of said end pieces abutting against said object; and means for selectively setting the distance to which the second tube member extends out of said third tube member to one of several predetermined positions to thereby vary the length of the jack bar.

2. The jack bar of claim 1 wherein said means for setting the distance to which the second tube member extends out of said third tube member comprises a pair of opposing apertures formed in said second tube member and a plurality of opposing paired apertures formed in said third tube member, the paired apertures in said third tube member being longitudinally spaced from each other, and a snap pin fitted through the apertures formed in said second tube member and through a selected one of the pairs of apertures formed in said third tube member.

3. The jack bar of claim 1 wherein all of said tubes have rectangular cross sections.

4. An extendible jack bar for retaining cargo in a compartment having at least one wall comprising:

a central tube member having a ratchet formed on the outer wall thereof;

a first end piece attached to one end of said central tube member;

a second tube member, said central tube member being telescopically fitted within said second tube member;

a handle operated drive ratchet member mounted on the end of said second tube member into which said central tube member is fitted, said drive ratchet member engaging said ratchet on said central tube member and operating to drive said central tube member out of said second tube member;

a third tube member, said second tube member being telescopically fitted within said third tube member;

a second end piece attached to the end of said third tube member opposite to that into which said second tube member is fitted, one of said end pieces abutting against said compartment wall and the other of said end pieces abutting against the cargo; and means for selectively setting the distance which the second tube member extends out of said third tube member to one of several positions, thereby varying the length of the jack bar.

5. The jack bar of claim 4 wherein said means for setting the distance to which the second tube member extends out of said third tube member comprises a pair of opposing apertures formed in said second tube member and a plurality of opposing paired apertures formed in said third tube member, said paired apertures in said third tube member being longitudinally spaced from each other, and a snap pin fitted through the apertures formed in said second tube member and through a selected one of said pairs of apertures formed in said third tube member.

6. The jack bar of claim 4 wherein all of said tubes have a rectangular cross section.

* * * * *